United States Patent [19]

Offutt

[11] 3,782,826
[45] Jan. 1, 1974

[54] METHOD AND APPARATUS FOR MEASURING ROTATIONAL ANGLES BY MEASURING CHANGES IN OPTICAL BEAM PATH LENGTH

[75] Inventor: Warren B. Offutt, Geneva, Ill.

[73] Assignee: Cutler-Hammer, Inc., Milwaukee, Wis.

[22] Filed: Aug. 21, 1972

[21] Appl. No.: 282,506

[52] U.S. Cl. ............................................. 356/110
[51] Int. Cl. ........................................... G01b 9/02
[58] Field of Search .................... 356/106, 107, 110

[56] References Cited
UNITED STATES PATENTS
3,482,919   12/1969   Barringer ......................... 356/106

FOREIGN PATENTS OR APPLICATIONS
154,059   1963   U.S.S.R. ............................. 356/110

Primary Examiner—John K. Corbin
Assistant Examiner—Conrad Clark
Attorney—Roland I. Griffin

[57] ABSTRACT

Method and apparatus for converting an angle of rotation of a rotatable device into related measureable changes in the length of the path of an optical beam, said changes in beam path length being measured by a suitable means such as an interferometer. In one embodiment a refractive element positioned on the rotatable device in the path of the optical beam produces the measurable change in optical beam path. In another embodiment a pair of reflective surfaces positioned on the rotatable device in the beam path produce the change in path length. In still another embodiment both the reflective surfaces and the refractive element are positioned in the beam path, nonlinearity in the path length change produced by the reflective surfaces being balanced out by nonlinearity in the path length change produced by the reflective element, resulting in a substantially linear optical path length change with rotation angle.

3 Claims, 6 Drawing Figures

PATENTED JAN 1 1974                                    3,782,826
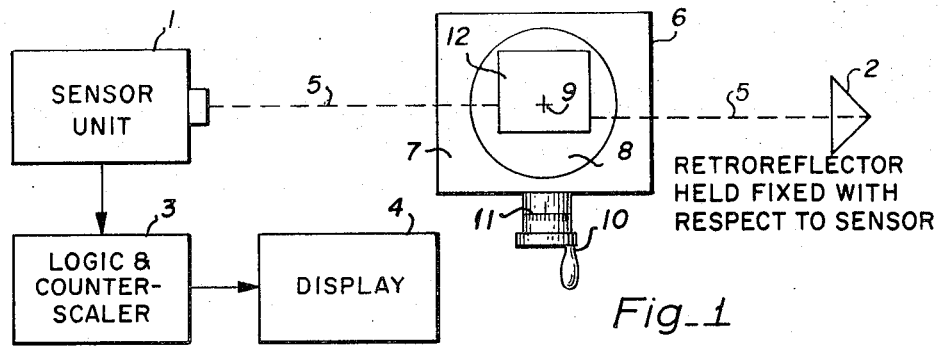
Fig_1
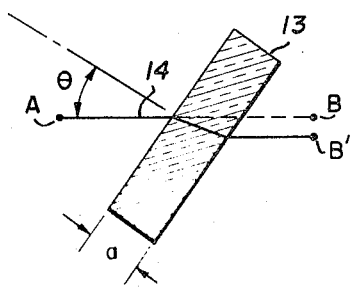
Fig_2
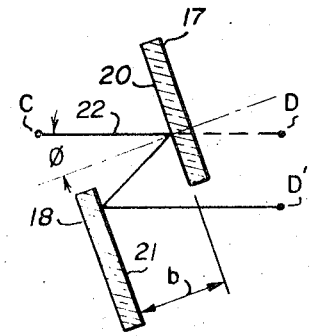
Fig_4
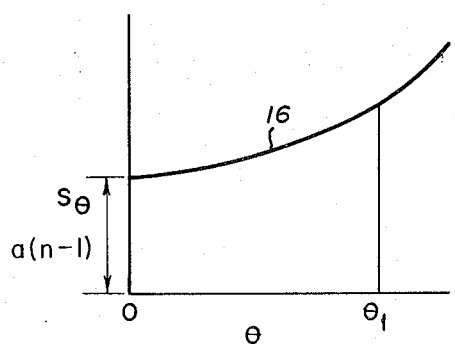
Fig_3
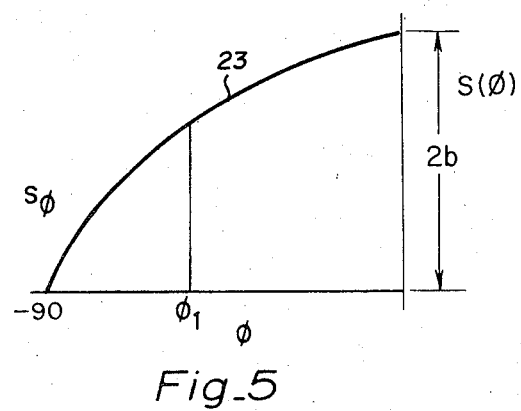
Fig_5
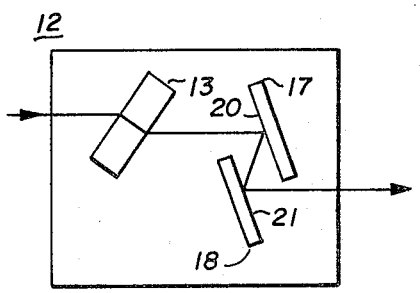
Fig_6

METHOD AND APPARATUS FOR MEASURING ROTATIONAL ANGLES BY MEASURING CHANGES IN OPTICAL BEAM PATH LENGTH

BACKGROUND OF THE INVENTION

Small angles of rotation of a rotatable device, of about one degree or less, can be measured to a precision of one arc-second or better by means of an autocollimator. The measurement requires manipulative skill and time, and is displayed visually as the position of a spot of light on a calibrated reticle. The largest single step measurement that can be made with an autocollimator depends upon the design of the instrument, which involves a compromise between resolution and angular field or measurement range. Larger angles are measured with the autocollimator by reference to different faces of a precisely constructed polygonal mirror having several hundred sides.

A variety of other devices, optical and other, are known and used for angular measurement. Generally the degree of precision they afford is restricted by practical considerations of cost and convenience. Certain of these devices require a very precise knowledge of the axis of rotation and also suffer from sensitivity to translatory displacement.

SUMMARY OF THE PRESENT INVENTION

In the present invention, one or more pairs of parallel plane optical surfaces are disposed in fixed positional relationship to each other on a supporting member that is adapted to rotate with or be rotated by a physical body that rotates through an angle which is to be measured. The positional relationships between the surfaces are predetermined to provide an optical path through the assembly that has parallel exit and entrance portions, and a length through the assembly that is a precise function of the angular position of the assembly with respect to an incident optical beam, and independent of translatory displacement.

The angular field and hence the single step measurement range may be tens of degrees, with a large enough coefficient of path length to angle differential to easily resolve angular displacements of one arcsecond or less. Using a commercially available interferometer, the angle measurement is made simply by noting or recording the digital readout, which generally is in terms of decimal inches. The initial setup and alignment requires no additional instrumentation, little time, and no special skill.

The optical device may be designed to provide a specific essentially linear relationship between angle and path length such that the numerical readout is directly in angular terms, such as arcseconds, if desired. With a moderate sacrifice in single step range, the device may be designed to resolve angular displacements of one tenth arcsecond or less, without prohibitive size or cost considerations.

In one embodiment of the invention, a refractive element is positioned on the rotatable device in the path of the beam, said element having parallel beam entrance and exit surfaces parallel to the axis of rotation of the device; rotation of the plate produces a measurable change in the optical path length related to the angle of rotation.

In another embodiment, a pair of reflective surfaces are positioned on the rotatable device in the path of the optical beam, the reflective surfaces being parallel, spaced apart, and facing one another, and also being parallel to the axis of rotation of the device. The optical beam is incident on one reflective surface, reflected therefrom onto the other reflective surface, and reflected from said other surface on an exit path. Rotation of the pair of surfaces with the rotatable device produces a measurable change in the optical path length.

In still another embodiment both the refractive element and the reflective surfaces are positioned in series in the optical beam path, nonlinearities in the beam path length change produced by the refractive element being balanced out by opposite sense nonlinearities produced in the path length change by the two reflective surfaces, resulting in a substantially linear relationship between optical path length change and rotational angle over a substantial angular distance.

DESCRIPTION OF THE DRAWINGS

FIG. 1 is a schematic diagram illustrating an angle measurement setup with an interferometer and an angle-to-path length transducer embodying the invention.

FIG. 2 is a cross-sectional view of a plane parallel plate of transparent material, illustrating the path of a light ray through the plate.

FIG. 3 is a graph showing the change in length of an optical path produced by the device of FIG. 2, as a function of the angle of incidence.

FIG. 4 is a cross-sectional view of a pair of plane parallel mirrors arranged in the manner of a periscope, illustrating the path of a light ray reflected by the mirrors in succession.

FIG. 5 is a graph showing the change in length of an optical path produced by the device of FIG. 4, as a function of the angle of incidence.

FIG. 6 is a plan view of a composite device including both refractive and reflective elements, capable of providing an essentially linear relationship between path length change and incidence angle over a wide range of operation.

DESCRIPTION OF THE PREFERRED EMBODIMENTS

Referring to FIG. 1, a lineal displacement measuring interferometer is shown generally as comprising a sensor unit 1, a retroreflector 2, electrical system 3, and display means 4. This apparatus may be of a known type, such as that shown and described in U.S. Pat. No. 3,409,375, issued Nov. 5, 1968 and entitled Gauging Interferometer Systems. The sensor unit 1 may be the group of components generally designated by the reference numeral 16 in FIG. 1 of said patent; retroreflector 2 and display 4 correspond to elements 7 and 20 respectively, and the electrical system 3 is the remainder of the system of the patent FIG. 1.

In the measurement of lineal displacement as described in the patent, the retroreflector is mounted on a movable element such as a machine carriage and the sensor is mounted on a stationary reference such as a machine bed. Movement of the retroreflector toward or away from the sensor unit changes the length of the optical path between them. The change in length is measured interferometrically and is exhibited as a numerical representation of the displacement.

In the measurement of angular displacement as depicted in FIG. 1, the retroreflector 2 is held fixed with respect to the sensor unit 1, by mounting both elements on a dimensionally stable support such as surface plate, an optical bench, or upon relatively movable parts of a machine tool, providing said parts are left stationary during the measurement. The optical measurement path of the interferometer system is indicated generally by the dash line 5, with the understanding that the light beam actually makes two passages between the sensor unit and the retroreflector along the dotted line 5.

The angular displacement to be measured in this instance is that of a rotary table 6, which comprises a stationary base 7 supporting a flat circular table member 8 for rotation about its central axis 9, this axis being perpendicular to the flat surface and perpendicular to the plane of the paper in FIG. 1. A manually operable crank 10 is arranged in known manner to rotate the table 8 with respect to the base 7. Suitable calibrated scale and fiducial mark means 11 are arranged in usual manner to provide a visually readable indication of the angular position of the table 8 with respect to the base 7.

The purpose of the setup of FIG. 1 is to check the accuracy of such indications, for example to construct an error curve or a correction chart. To this end, the table 6 is placed with the flat surface of its rotary member 8 near and parallel to the interferometer measurement path 5, and the optical device 12 which will be described is placed on the member 8 so as to intercept the path 5. The table axis 9 need not pass exactly through the path 5, and no special precision is required in the positioning and alignment of the device 11 on the member 8.

The length of the optical path through the device 12 is a precisely predetermined function of the angular position of the device 12 with respect to the measurement path 5. Accordingly, any angular displacement of the table 8 will result in a change in the optical length of the measurement path, and the change will be measured by the interferometer in the same manner as a change in the distance between the sensor 1 and the retroreflector 2.

Ordinarily, the change in path length will be indicated by the display device 4 in terms of lineal units such as decimal inches, rather than in angular units such as arcseconds. Conversion may be made by reference to a prepared tabulation. Alternatively, the counter-scaler device 3 may be modified in known manner to include, or to function as, a simple computer performing the conversion to make the display indicate directly in angular units. At present it is preferred to design the optical device 12 to produce a change in path length which, expressed in lineal units, is numerically equal to the angular displacement expressed in angular units.

Referring to FIG. 2, a plane parallel plate 13 of transparent material is disposed to intercept the path 14 of a collimated beam of light directed from point A toward point B. In the absence of the plate 13, the light beam would continue as indicated by the dash line extension, directly from A to B, and the optical length of the path from A to B would be simply the distance from A to B. If the plate 13 were perpendicular to the beam path 14, the beam would still follow a straight line from A to B, but the optical length of the path would be greater by an amount $$S(O) = a(n - 1)$$

where $a$ is the thickness of the plate and $n$ is the refractive index of an isotropic transparent material such as optical glass, for example. If the plate 13 is tilted at an angle $\theta$ from the perpendicular, as shown, the beam is deflected according to Snell's Law, toward the normal at the incident surface of the plate and away from the normal at the exit surface, following a path indicated by the solid line to the point B'. Considering the point B' to lie in a plane that is common with point B and perpendicular to the line AB, the physical distance of said plane from point A remains constant, but the optical distance, i.e. the optical length of the solid line path between A and B', is greater by an amount attributable in part to the fact that the geometrical path is longer and in part to the fact that a portion of the path is within the refractive material. It is evident that the optical path length is a function of the angle $\theta$, and it can be shown that the optical length of the path from A to B' is greater than the distance from A to B by the amount $$S(\theta) = a[(n^2 - \sin^2 \theta)^{1/2} = \cos \theta] .$$

Referring to FIG. 3, the above relationship for a plate like that of FIG. 2 is of the form illustrated by the curve 16. Such a plate can be used as the optical device 12 of FIG. 1, because the added path length $S(\theta)$ is deterministically related to the angle $\theta$. The plate dimension $a$ and the initial bias angle $\theta_1$ may be chosen for some desired slope at $\theta_1$ for direct reading in microinches per arcsecond. Note that the curve 16 is concave upward, with zero slope at $\theta = 0$ and increasingly positive slope as $\theta$ is increased.

The thickness $a$, refractive index $n$, and bias angle $\theta_1$ may be so chosen that the slope of the curve 16 at $\theta_1$ is, for example, 10 microinches per arcsecond. Then, assuming the interferometer display is in tens of microinches, small angular displacements in the vicinity of the initial bias angle $\theta_1$ will be indicated directly in arcseconds, without need of numerical conversion. Larger displacements may be measured with similar precision if desired, but conversion will be required owing to the nonlinearity of the curve 16.

Referring to FIG. 4, two plane mirrors 17 and 18 are arranged in the manner of a periscope with their reflecting surfaces 20 and 21 parallel and facing each other. The structure is disposed to intercept the path 22 of a collimated beam of light directed from point C toward point D. The beam is reflected by the mirrors 17 and 18 in succession, following a path indicated by the solid line to the point D'. The optical length of said path is greater than the distance CD by an amount $$S(\phi) = 2 b \cos \phi$$

where b is the distance between the reflecting surfaces 20 and 21 and $\phi$ is the angle of incidence between the initial beam path 22 and the normal to the surface 20.

Referring to FIG. 5, the above relationship for a parallel mirror arrangement like that of FIG. 4 is of the form illustrated by the curve 23. Such an arrangement can be used as the optical device 12 of FIG. 1, because the added path length $S(\phi)$ is deterministically related to the angle $\phi$. The curve 23 is concave downward, with maximum slope at $\phi = -90°$ and decreasingly positive slope as $\phi$ is increased. The distance $b$ and initial bias angle $\phi_1$ may be chosen for some desired slope at $\phi_1$ for direct numerical indication in the vicinity of the initial bias angle as in the case of the plate of FIG. 2, and as in that case, larger displacements may be measured with conversion.

In FIGS. 2 and 4, if the normal to the surface of plate 13 or the normal to the surface 20 of mirror 17 falls below the beam 14 or 22, respectively, impinging thereon, this is taken as a negative angle; a normal above the ray is a positive angle.

By combining the refractive plate of FIG. 2 with the two reflective elements of FIG. 4 in a single optical path as shown in FIG. 6, the nonlinearity in the change in optical path length due to the motion of the refractive plate 13 illustrated by the curve 16 of FIG. 3 is substantially cancelled by the nonlinearity in the change in the optical path due to the motion of the two reflective elements 17, 18 illustrated by the curve 23 of FIG. 5, with a resultant linear change in optical path with rotation of the combined devices. Thus, the increasing positive slope of curve 16 balances the decreasing positive slope of curve 23, giving a resultant linear trace for optical path length change versus angle of rotation. This linearity will endure for rotation over a fairly wide angle, for example ± 10° with an accuracy of about ± 2 arcseconds.

It should be noted that additional optical devices may be positioned on the rotatable object and in the beam path for producing further changes in the length of the optical path. For example, two dielectric plates may be utilized in lieu of the single plate 13, and, provided each plate is half the width of plate 13, the optical path length change per increment of rotation will be the same.

I claim:

1. The method of measuring the angle of rotation of an object comprising the steps of positioning a refractive element on the object, said refractive element having two parallel surfaces parallel to the axis of rotation of the object, directing an optical beam through said refractive element, said beam being incident on one of said refractive element surfaces and exiting from the other surface, positioning a pair of reflective surfaces on the object, said reflective surfaces being parallel, spaced apart, and facing each other, the reflective surfaces being parallel to the axis of rotation of said object, said optical beam being directed over an entrance path onto one of said reflective surfaces where it is reflected onto the other surface for reflection in an exit path parallel to the entrance path, and measuring the change in the optical length of the beam path as the refractive element and the two refractive surfaces rotate in the path of said beam as the object rotates.

2. Apparatus for measurement of angular displacement of a rotatable device having an axis of rotation, said apparatus comprising:

a distance measuring interferometer of the type wherein a collimated optical beam is transmitted over a measurement path and a change in length of said path is determined by an interference fringe count;

a refractive element having two parallel surfaces parallel to the axis of rotation of said rotatable device; and a pair of reflective elements positioned parallel to the axis of rotation of said rotatable device, spaced apart and facing each other, said refractive element and said pair of reflective elements being supported by said rotatable device for rotation about an axis perpendicular to said measurement path and in a position to intercept said measurement path so that said optical beam is incident on one of said parallel surfaces of said refractive element and exits from the other of said parallel surfaces of said refractive element, said optical beam thence being incident on one reflective element and reflected therefrom onto the other reflective element from which it is reflected along an exit path, the length of said measurement path changing as said refractive element and said reflective elements rotate to produce an interference fringe count which is responsive to angular displacement of said rotatable device.

3. Apparatus as claimed in claim 2 wherein said refractive element comprises two mutually parallel refractive elements.

* * * * *

UNITED STATES PATENT OFFICE
CERTIFICATE OF CORRECTION

Patent No. 3,782,826                     Dated    January 1, 1974

Inventor(s)    Warren B. Offutt

It is certified that error appears in the above-identified patent and that said Letters Patent are hereby corrected as shown below:

On the cover sheet the assignee should read as follows:

-- by mesne assigts. to Hewlett-Packard Company, a Corporation of California --.

Signed and sealed this 15th day of October 1974.

(SEAL)
Attest:

McCOY M. GIBSON JR.                C. MARSHALL DANN
Attesting Officer                  Commissioner of Patents